No. 613,603. Patented Nov. 1, 1898.
W. P. QUIMBY.
TYPE WRITING MACHINE.
(Application filed May 24, 1898.)
(No Model.) 2 Sheets—Sheet 1.
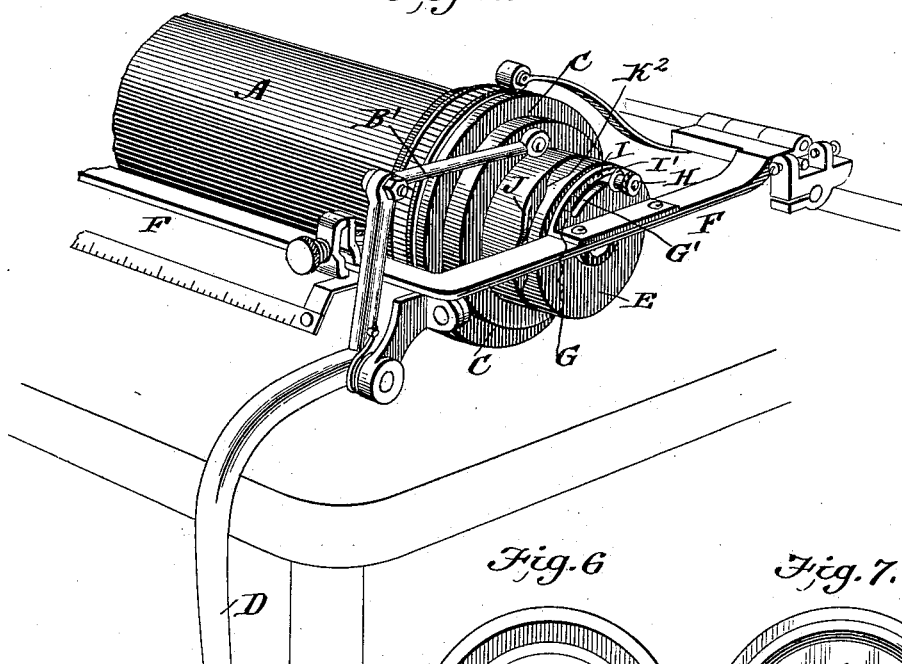
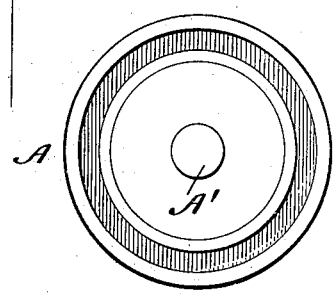
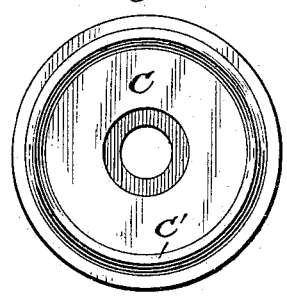
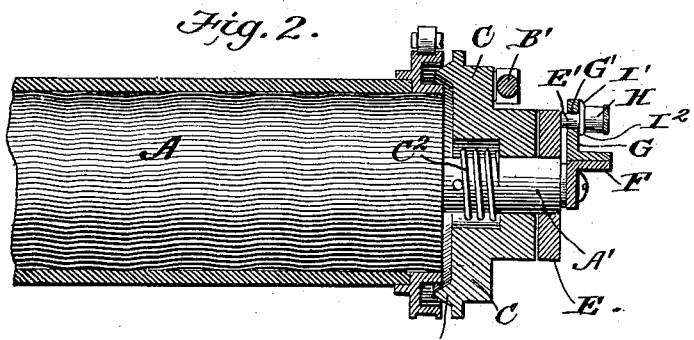
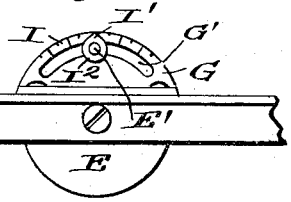
WITNESSES: INVENTOR
W. P. Quimby.
BY
ATTORNEYS.

No. 613,603. Patented Nov. 1, 1898.
W. P. QUIMBY.
TYPE WRITING MACHINE.
(Application filed May 24, 1898.)
(No Model.) 2 Sheets—Sheet 2.
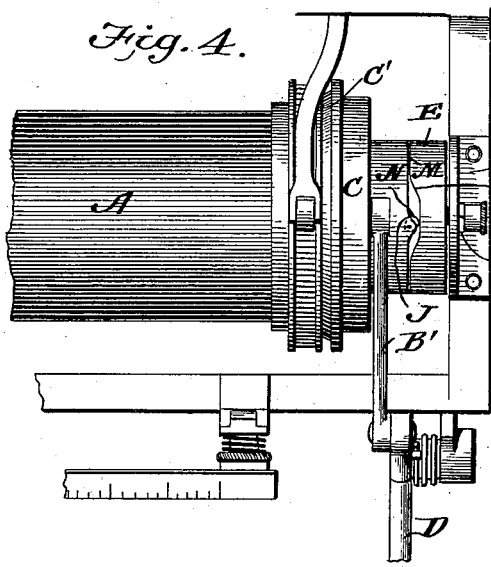
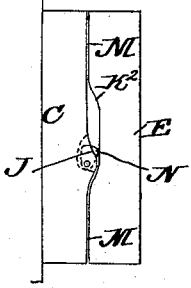
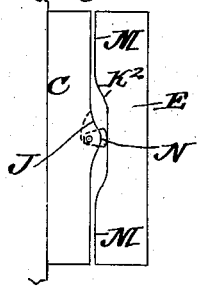
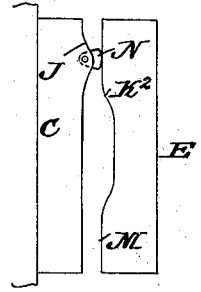
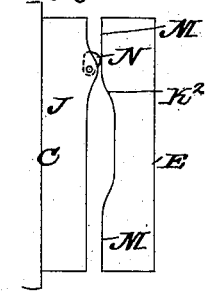
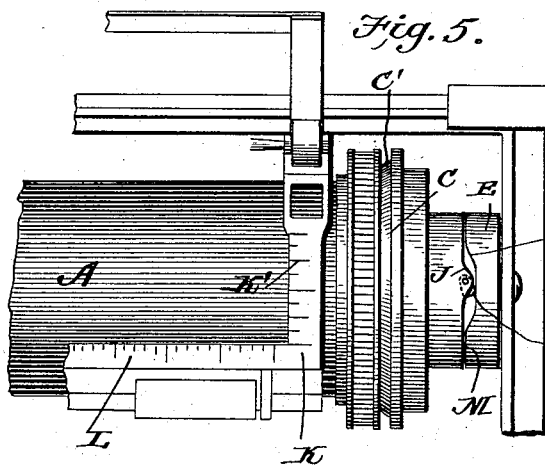
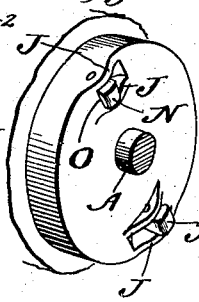
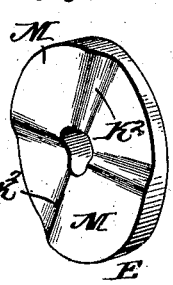
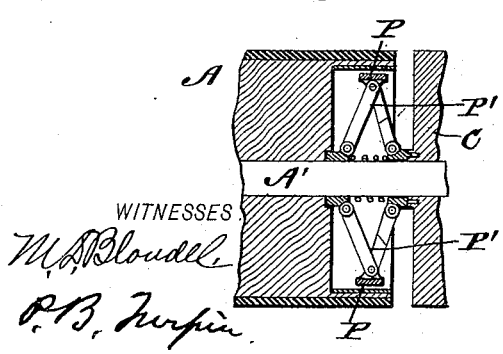
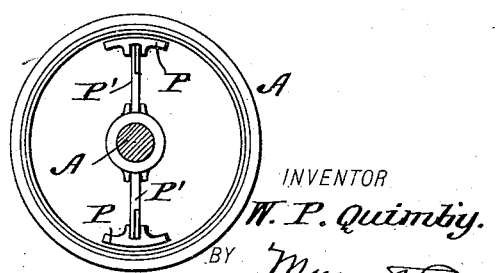
WITNESSES
INVENTOR
W. P. Quimby.
BY Munn & Co.
ATTORNEYS.

UNITED STATES PATENT OFFICE.

WILLIAM PERRY QUIMBY, OF GETTYSBURG, PENNSYLVANIA.

TYPE-WRITING MACHINE.

SPECIFICATION forming part of Letters Patent No. 613,603, dated November 1, 1898.

Application filed May 24, 1898. Serial No. 681,573. (No model.)

*To all whom it may concern:*

Be it known that I, WILLIAM PERRY QUIMBY, a resident of Gettysburg, in the county of Adams and State of Pennsylvania, have invented a new and useful Improvement in Type-Writers, of which the following is a full, clear, and exact description.

My invention is an improvement in typewriters, being in the nature of an improved spacing mechanism, having for an object to provide a novel construction whereby the lines will be spaced apart any desired distance by the operation of the spacing-lever; and the invention consists in the novel constructions and combinations of parts, as will be hereinafter described, and pointed out in the claims.

In the drawings, Figure 1 is a perspective view of my improvement. Fig. 2 is a vertical longitudinal section thereof; and Fig. 3 is an end view, parts being removed. Figs. 4 and 5 are respectively top and bottom plan views. Figs. 6 and 7 are respectively detail views of the platen and clutch-section. Figs. 8, 9, 10, and $10^a$ are side views in diagrammatic form, illustrating the movable clutch device in connection with the clutch-section and the abutment. Fig. 11 is a detail perspective view of the clutch-section with the clutch devices in place. Fig. 12 is a detail perspective view of the cam and abutment. Figs. 13 and 14 illustrate a modified construction, all of which will be described.

In the accompanying illustration I have shown my invention as embodied in a machine of the Remington type; but it is obvious that the invention may be applied to any similar form of machine having the revolving platen A.

In carrying out my invention I employ the spacing-lever D, whose motions are imparted to the platen for turning the same, and in connection with such spacing-lever and the means whereby its movement is imparted to the platen I furnish devices which operate to vary the extent to which the movement of the lever is imparted to the platen. Bearing in mind that I provide means for varying the extent to which the movement of the lever is imparted to the platen, it will be understood that thereby I provide for varying the distance to which the platen is moved by the movement of the spacing-lever without varying the movement of such lever, so that I may have at all times a uniform movement of the spacing-lever and effect by such uniform movement of the lever a varying movement of the platen, and may secure thereby a very narrow or wide spacing of the lines or any intermediate spacing that may be desired. I also furnish graduations or scales whereby to set the regulating devices to secure accurately the width of spacing desired.

In the construction shown I provide on the shaft A' of the platen A the clutch-section C, which is adapted at C' for engagement with the platen to turn the same when the section C is operated in the manner presently described. This section C is loose on the shaft of the platen, and is held normally out of engagement with the platen by means of the spring $C^2$, and is forced into engagement with the platen by cam mechanism, which includes a cam surface or surfaces between the clutch-section C and a clutch-setting plate E, which is supported on the carriage F of the machine.

The clutch-setting plate E preferably turns on the shaft A' of the platen A and is provided with a stub-shaft E', which extends through a curved slot G' in a quadrant G on the carriage F and receives a thumb-nut H, by which the section or plate E may be clamped in any desired adjustment. The quadrant G has a scale or graduation I adjacent to its slot G', which scale is registered by a pointer or indicator I' on the shaft E', such indicator being preferably on a collar $I^2$, arranged between the set-nut and the quadrant, as shown. This construction provides for adjusting the clutch-setting plate to any desired position and for securing it when so adjusted.

The cam mechanism preferably includes a cam-surface J on the clutch-section C and a cam-surface $K^2$ on the setting-plate E, arranged to engage as the clutch-section is oscillated by the movement of the spacing-lever to which it is connected and by which it is oscillated by means of the link or pitman B'.

In the operation of my invention as the spacing-lever is operated in the usual manner it will move the clutch-section; but the latter will not move the platen unless engaged therewith, and such engagement of the clutch-section is controlled and regulated by the clutch-setting plate before described. If this clutch-setting plate be adjusted to throw its cam-surface toward the front of the machine, it will cause the clutch-section to engage the platen at the beginning or during the first portion of the stroke of the spacing-lever and to continue in such engagement until the end of the upward movement of the spacing-lever, thus giving a considerable movement of the platen and effecting a wide spacing of the lines. As will be readily understood, this spacing of the lines may be varied by adjusting the setting-plate to throw its cam rearwardly from the forward position just described, the narrowest spacing of the lines being effected by adjusting the cam of the setting-plate to its rearmost position.

On one or both of the clamp-plates K, beneath the platen, I provide graduation K', which is related to the graduations I on the quadrant G and is useful in quickly adjusting the spacing mechanism to paper which may be ruled with lines or which may contain writing which it is desired to follow with similar spacing. In such use of the device the paper may be put in the machine with one line of the writing registered with the line-plate L of the machine and its next line registering with the graduation K', the latter graduation indicating the proper point in the graduation I which should be registered by the indicator I' to secure the proper spacing desired.

In connection with the construction before described I provide means whereby to avoid any back action of the clutch-section upon the platen as the clutch-section is returned after a spacing operation to its initial position. To this end I provide a movable clutch device operating in connection with the clutch-section C and arranged to bind between such clutch-section and the back abutment M on the clutch-setting plate. In practice I prefer to employ two of these movable clutch devices on the clutch section or plate C and to construct them in the shape of pawls N, pivoted to the clutch-plate C and arranged to swing out as such plate C is moved up to engage the abutment M and to bear at their swinging ends against such abutment, being supported in such position by the shoulder O, against which the pawl presses as the clutch-plate is operating to turn the platen. On the return movement of the clutch-setting plate the pawl slips from the position shown in Fig. 10, where it engages the abutment M, to the position shown in Fig. 10ᵃ, wherein the pawl is free of the abutment and clutch-section C is free of engagement with the platen. By this means the clutch-section is firmly operated into engagement with the platen during the spacing stroke of the lever and is freed from such engagement during the return movement of the spacing-lever, thus preventing any back spacing of the platen.

While the engagement of the section C with the platen may be carried out by the construction in Fig. 2, it will be understood that where desired engagement may be secured by the construction shown in Figs. 13 and 14, wherein brake-shoes P are arranged to engage within the platen and are supported on toggle-arms P', supported on the shaft of the platen and arranged for operation by the clutch-section C, as is best shown in Fig. 13.

In the operation of said construction shown in Fig. 13 if the part C be moved to the left by the action of a part similar to E, Figs. 4 and 5, it is evident the toggle-arms P' will be operated to throw the shoes out into engagement with the surrounding flange.

It should be understood that the outer collar supporting the toggle-arms and encircling the shaft A' is connected with clutch-section C and partakes of the rotary movement of such clutch-section, so that if such section C be moved slightly to the left from its position shown in Fig. 13 it will cause the shoe P to engage the platen, when if the section C be turned the shoes P will turn with it and will operate to turn the platen A.

Having thus described my invention, what I claim is—

1. In a type-writer spacing mechanism, the combination of the platen, the clutch-section provided with portions engaging the platen, means whereby the clutch-section may be operated, a cam for setting the clutch-section into engagement with the platen and a movable clutch device operating in connection with the clutch-section, substantially as described.

2. In a type-writer spacing mechanism, the combination of the platen, the clutch-section, a back abutment for the clutch-section, a cam for directing the clutch-section into engagement with the back abutment, means for operating the clutch-section and a movable clutch device operating in connection with the clutch-section and between the same and the back abutment, substantially as set forth.

3. In a type-writer spacing mechanism, the combination of the platen, the clutch-section provided with portions engaging the platen and with movable clutch devices, an abutment coöperating with such devices, spacing means, and devices whereby the extent to which the movement of the spacing means is imparted to the platen may be varied, substantially as set forth.

4. In a type-writer spacing mechanism, the combination of the spacing device, the clutch-section provided with means engaging the platen, the clutch-setting plate having a cam and an abutment portion, the pawl pivoted to the clutch-section and engaging the abutment portion of the clutch-setting plate and means for operating the clutch-section, substantially as set forth.

5. In a type-writer spacing mechanism, the combination of the platen, the clutch-section provided with means for engaging the platen, the clutch-setting plate having a cam portion and an abutment portion and adjustable substantially as described, the movable clutch device consisting of a pawl pivoted at one end to the clutch-section and arranged at its other end to engage the abutment portion of the clutch-setting plate, the spacing-lever and a connection between the spacing-lever and clutch-section, substantially as set forth.

6. A type-writer spacing mechanism comprising the platen, the spacing-lever, means whereby the movement of the lever may be imparted to the platen including a movable clutch device, and devices whereby the extent to which the movement of the lever is imparted to the platen may be varied substantially as set forth.

7. A type-writer spacing mechanism comprising the platen, the spacing-lever, a clutch-section arranged for operation by the spacing-lever and for engagement with the platen, and cam mechanism whereby to set the clutch into engagement with the platen, substantially as set forth.

8. A type-writer spacing mechanism comprising the platen, the spacing-lever, the clutch-section arranged for operation by the spacing-lever and to engage the platen, a cam whereby the clutch-section may be forced into engagement with the platen, such cam being adjustable whereby the engagement with the clutch-section with the platen may be varied, and means for holding the cam in its different adjustments, substantially as set forth.

9. The combination of the platen and its shaft, the spacing-lever, the clutch-section arranged for operation by said lever, and turning on the shaft of the platen and devices whereby the clutch-section may during a part of its movement be engaged with the platen whereby to turn the same, substantially as set forth.

10. A type-writer spacing mechanism comprising the platen, the spacing-lever, the clutch-section arranged for operation by the spacing-lever and to engage the platen, a clutch-setting plate movable or adjustable relative to the clutch-section, a cam-surface between the clutch-section and setting-plate and devices for securing the setting-plate in any desired adjustment, substantially as set forth.

11. A type-writer spacing mechanism comprising the platen, means whereby the platen may be moved different distances including a pointer or indicator and a scale or graduation registered thereby and the paper-clamp plate on the under side of the platen having a graduation corresponding to that registered by the said pointer or indicator, substantially as described.

12. A type-writer spacing mechanism comprising the platen, the spacing-lever, the clutch-section connected with and operated by the spacing-lever and arranged to engage the platen and provided with movable clutch devices, and the clutch-setting plate having a cam-surface for engagement by the clutch devices of the clutch-section as the latter is moved by the spacing-lever, substantially as set forth.

13. A type-writer spacing mechanism consisting of the platen, the clamp-plate beneath the same having a graduation or scale, the clutch-section arranged to engage the platen and having a cam-surface, a spring by which the clutch-section is normally held out of engagement with the platen, the clutch-setting plate having a cam-surface coöperating with the clutch-section and a stud-shaft, and the quadrant-plate having a graduation corresponding to that of the clamp-plate and a slot through which the stud-shaft projects and a nut on said shaft, substantially as set forth.

14. The combination substantially as described of the platen, the clutch-section, the clutch-setting plate, having a stud-shaft and a plate having a slot through which such stud-shaft passes and a nut on said shaft, substantially as set forth.

15. In a type-writer spacing mechanism, the combination of the platen, the clutch-section provided with portions engaging the platen, means whereby the clutch-section may be operated and devices for setting the clutch-section into engagement with the platen, such clutch-setting devices being adjustable whereby the operation of the platen by the clutch may be varied without varying the movement of the means for operating the clutch-section, substantially as set forth.

WILLIAM PERRY QUIMBY.

Witnesses:
WM. MCSHERRY, Jr.,
WM. HERSH.